(12) United States Patent
Cress et al.

(10) Patent No.: US 11,421,509 B2
(45) Date of Patent: Aug. 23, 2022

(54) HIGH PRESSURE FLOAT VALVE

(71) Applicant: Pamala Ranee Cress, Tomball, TX (US)

(72) Inventors: Pamala Ranee Cress, Tomball, TX (US); Dianne Nadine Diaz, Pinehurst, TX (US); Stephen Jay Gerig, Houston, TX (US); Blake Morgan Mullins, Edmond, OK (US); Stephen Michael Seymour, Edmond, OK (US)

(73) Assignee: Pamala Ranee Cress, Tomball, TX (US)

( * ) Notice: Subject to any disclaimer, the term of this patent is extended or adjusted under 35 U.S.C. 154(b) by 49 days.

(21) Appl. No.: 16/756,834

(22) PCT Filed: Oct. 16, 2017

(86) PCT No.: PCT/US2017/056726
§ 371 (c)(1),
(2) Date: Apr. 16, 2020

(87) PCT Pub. No.: WO2019/078808
PCT Pub. Date: Apr. 25, 2019

(65) Prior Publication Data
US 2020/0240236 A1 Jul. 30, 2020

(51) Int. Cl.
*E21B 34/06* (2006.01)
*F16K 15/03* (2006.01)
(Continued)

(52) U.S. Cl.
CPC .............. *E21B 34/06* (2013.01); *E21B 21/10* (2013.01); *F16K 15/033* (2013.01); *F16K 15/063* (2013.01); *E21B 2200/05* (2020.05)

(58) Field of Classification Search
CPC ...... E21B 34/06; E21B 21/10; E21B 2200/05; F16K 15/033; F16K 15/063; F16K 17/04
See application file for complete search history.

(56) References Cited

U.S. PATENT DOCUMENTS

| 3,058,534 A | 10/1962 | Keithahn | |
|---|---|---|---|
| 3,066,693 A * | 12/1962 | Taylor, Jr. | ............... E21B 34/14 137/454.2 |

(Continued)

FOREIGN PATENT DOCUMENTS

| CA | 2491931 A1 | 7/2006 |
|---|---|---|
| CN | 202531104 U | 11/2012 |

(Continued)

OTHER PUBLICATIONS

International Search Report and Written Opinion dated Jun. 28, 2018 for corresponding PCT/US2017/056726.

(Continued)

*Primary Examiner* — Abby J Flynn
*Assistant Examiner* — Yanick A Akaragwe
(74) *Attorney, Agent, or Firm* — Ramey LLP; William P. Ramey, III; Jacob B. Henry

(57) ABSTRACT

A high-pressure float valve for positioning downhole within a well to control fluid flow includes a valve cage having a pair of side seal grooves each for receiving an exterior elastomeric seal therein and a plurality of cutouts provided on the top end of the valve cage. The valve cage can undergo nitride heat treatment and the internal components are made from 1018 hot rolled steel. The dimensions of a Model 5RF plunger-type valve and Model 5RG flapper-type float valve can be modified to meet the high pressure of a 10 ksi rating.

8 Claims, 15 Drawing Sheets

(51) Int. Cl.
*E21B 21/10* (2006.01)
*F16K 15/06* (2006.01)

(56) References Cited

U.S. PATENT DOCUMENTS

| | | | |
|---|---|---|---|
| 3,997,009 | A | 12/1976 | Fox |
| 4,624,316 | A | 11/1986 | Baldridge |
| 5,013,371 | A | 5/1991 | Kenzo |
| 5,268,102 | A | 12/1993 | Clay |
| 5,379,835 | A | 1/1995 | Streich |
| 5,450,903 | A | 9/1995 | Budde |
| 5,850,881 | A | 12/1998 | Rodger et al. |
| 2011/0192608 | A1* | 8/2011 | LeJeune ............ F16K 25/00 166/319 |

FOREIGN PATENT DOCUMENTS

| | | |
|---|---|---|
| DE | 102009036778 A1 | 2/2011 |
| RU | 2374538 C1 | 11/2009 |
| RU | 2438061 C2 | 12/2011 |
| RU | 2445537 C1 | 3/2012 |
| RU | 2015134798 A | 2/2017 |

OTHER PUBLICATIONS

Forum Energy Technologies "Drill Pipe Float Valves Catalog" dated Jan. 10, 2012.

"FAQ: What Are the Microstructural Constituents Austenite, Martensite, Bainite, Pearlite and Ferrite?" retrieved Jul. 13, 2017 http://www.twi-global.com/technical-knowledge/faqs/faq-what-are-the-microstructural-constituents-austenite-martensite-bainite-pearlite-and-ferrite/.

"Drill Pipe Float Valves: Why Settle for Less—Insist on the Best!" Drillmax Inc. Catalog FV-05-13.

Nace International The Corrosion Society, "Petroleum and Natural Gas Industries—Materials for Use in H2S-Continaing Environments in Oil and Gas Production" International Standard NACE MR0175/ ISO 15156-1, Item No. 21306; ISBN 1-57590-1765, published 2001.

"Drill Pipe Float Valves, Pullers, Baffle Plates & Float Subs" brochure, Stacey Oil Service & Rental Tools, LLC.

Extended European Search Report dated Apr. 1, 2021 for related European Patent Application No. 17928988.9.

* cited by examiner

HIGH PRESSURE FLOAT VALVE

REFERENCE TO EARLIER FILED APPLICATION

This application is the National Stage of International Application No. PCT/US2017/056726, filed Oct. 16, 2017, entitled "HIGH PRESSURE FLOAT VALVE", which is specifically incorporated by reference in its entirety herein.

FIELD

The disclosure relates generally to a valve structure. The disclosure relates specifically to float valve for use in a string of drill pipe to control the flow of fluid therethrough during drilling of wells.

BACKGROUND

Drill pipe float valves are downhole safety valves that create barriers to prevent unwanted flow of fluids up the drill string. In drilling oil well bores, a highly density fluid, called mud, is usually pumped through the strings to aid the bit in drilling through the ground. Sometimes high pressure in a well bore can cause reverse circulation and bring about a dangerous condition referred to as "blow out". Float valves are utilized in drill pipes for controlling the flow of fluid therethrough so that fluid, such as drilling mud, is permitted to flow downwardly through the string but fluid under pressure is prevented from returning under pressure upwardly through the drill pipes, such as in the event of a blow-out. When fluid flow down the drill string stops, a higher pressure below the float valve than that above the float valve holds the valve closed. Fluid is therefore prevented from migrating back up the drill string. This allows for operations on the drill string at surface, such as addition or removal of drill pipe. Various forms of float control valves have been devised to provide characteristics of substantially unrestricted flow downward through the valve and quick closure of the valve when circulation of the pressurized flow from above is stopped or a sudden rise in pressure is experienced downhole.

An example of this type of valve is a Model F plunger-type valve, the Model F plunger-type valve provides an instant shutoff feature. The piston gives a reliable and economical way to completely stop flow-back when connections are being made or broken during standard drilling operations. This model can get a positive instantaneous shutoff with consistent fluid control throughout drilling.

Another example of this type of valve is Model G full flow flapper-type valve which has an investment cast flapper. It allows for full unobstructed flow through the valve and its quick opening mechanism prevents shavings from entering the drill string when circulation stops. Additionally, the valve fully opens when the first joint is raised from the hole, preventing the pulling of wet joints. With these flappers, the investment cast is case hardened for wear resistance.

Prior art float valves are disclosed in U.S. Pat. Nos. 3,997,009 and 5,379,835. The Baker Line Model F Drill Pipe Float Valve is disclosed in Technical Manual Number 480-13. Valves and sealing assemblies commonly used in cementing operations are disclosed in U.S. Pat. Nos. 4,624,316 and 5,450,903.

The presently known and used drill pipe float valves fail to meet certain conditions and operating problems encountered in well drilling. In some cases, such as deep-water drilling or in the case of drilling very deep subterranean wells, the drill bit and bottom of the wellbore may experience extreme pressures and temperatures. In certain embodiments, pressure may be approximately 10 kilopounds per square inch (ksi) or greater. Due to the high pressures, the float valves may deform and lose their integrity within the pipeline, and not be effective in controlling the back flow of fluids.

Therefore, it would be beneficial to have a float valve which may be constructed to withstand the high pressure from up or down the float valve, so that the float valve is not deformed or damaged under high pressure conditions.

SUMMARY

An embodiment of this disclosure is a high-pressure float valve, comprising a valve cage having a pair of side seal grooves each for receiving an exterior elastomeric seal therein; wherein the valve cage is exposed to a nitride heat treatment; internal components within the valve cage, wherein the internal components of the valve cage are made from hot rolled steel; and wherein the high-pressure float valve can undergo pressures up to 10 ksi. In an embodiment, the pair of side seal grooves are present on a downstream side of the valve. In an embodiment, a plurality of cutouts is present at the top end of the valve cage. In an embodiment, the high-pressure float valve further comprises a valve element comprising a valve stem and a valve poppet, wherein the interface angle between an inner surface of the valve cage and a conical exterior surface of the valve poppet is about 50 degrees to about 60 degrees; and a support and a guide to limit the valve element to movement substantially along the central axis of the float valve. In an embodiment, the interface angle is about 55 degrees. In an embodiment, the high-pressure float valve further comprises a fillet at an interface of the valve stem and the valve poppet. In an embodiment, the thickness of the poppet is about 0.375". In an embodiment, the thickness of the poppet is 0.375". In an embodiment, the diameter of the poppet is about 2.948". In an embodiment, the diameter of the poppet is 2.948". In an embodiment, the length of the valve stem is about 5.148". In an embodiment, the length of the valve stem is 5.148". In an embodiment, the high-pressure float valve further comprises a flapper valve capable of engagement with the lower end of a seal ring; a seal ring protected by a retainer sleeve; a retainer sleeve, wherein the retainer sleeve fits within a seal retainer cavity in the valve cage; and a dovetail groove located at the base of the seal retainer cavity in the valve cage. In an embodiment, the high-pressure float valve further comprises a back angle located at the sealing surface of the seal retainer cavity. In an embodiment, the back angle is about 3.0 degrees to about 8.0 degrees. In an embodiment, the back angle is about 5.0 degrees. In an embodiment, a thickness of the flapper valve is about 0.418". In an embodiment, a thickness of the flapper valve is 0.418". In an embodiment, a height of the seal retainer cavity is about 0.500". In an embodiment, a height of the seal retainer cavity is 0.500".

An embodiment of this disclosure is an improved float valve to withstand high pressure in a downhole environment. The float valve comprises a valve cage which has a pair of side seal grooves each for receiving an exterior elastomeric seal therein. A plurality of cutouts is provided on the top end of the valve cage. With regard to a plunger-type float valve, it further comprises a valve element including a valve stem and a valve poppet; and a support and a guide to limit the valve element to movement substantially along the central axis of the float valve. With regard to a flapper-type float valve, it further comprises a flapper valve that swings upwardly into engagement with the lower end of a seal ring protected by a retainer sleeve which fits within a seal retainer cavity in the valve cage.

An embodiment of this disclosure is an improved float valve that can withstand high pressure up to 10 ksi rating.

In an embodiment, nitride heat treatment is applied to the valve cage and the internal components are made from steel. In an embodiment, the internal components are made from 1018 hot rolled steel.

In an embodiment, the side seal grooves and seals are repositioned to be further towards the downstream side of the valve; keeping the outside diameter of a float valve unchanged and reducing the inner diameter or throat of the valve.

In an embodiment, with regard to a plunger-type float valve, the angle between the inner surface of the valve cage and conical exterior surface of the poppet varies from 50 degrees to 60 degrees, a fillet is added to the corner between the valve stem and the valve poppet. In an embodiment, the guide is repositioned toward the downstream side of the float valve to maintain easy of assembly and field service of the valve for high pressure design. The length of the stem can be reduced to prevent the valve stem from sticking out the back of the valve and the radius contour of the valve seal disk is updated to match the contour of the valve stem. The thickness of the poppet is increased to improve the pressure carrying capabilities, and the diameter of the poppet is reduced to allow for usage of current production elastomer seal with the new design. Correspondingly, the valve seat interface should be increased slightly to ensure adequate seal contact with the valve cage based on the updates to the poppet design.

In an embodiment, with regard to a flapper-type float valve, a dovetail groove is provided at the base of the seal retainer cavity in the cage. A back angle is provided to the sealing surface of the seal retainer cavity to help reduce the chance for extrusion of the seal retainer into the inner diameter of the valve cage. The back angle can be about 3 degrees to about 8 degrees. In a preferred embodiment, the back angle α is about 5 degrees. In an embodiment, the height of the flapper is increased to reduce the stress at elevated pressures and the outer seals are repositioned to the downstream side of the valve to reduce the stress of the cage at elevated pressures. Correspondingly, the flapper interface is repositioned towards the downstream side of the valve to allow for clearance of the repositioned side seal grooves. The height of the seal retainer cavity is increased to prevent interchangeability with the current production designs and the depth of the seal retainer cavity is increased.

The improved float valve can withstand the high pressure within the interior of a casing string.

The foregoing has outlined rather broadly the features of the present disclosure in order that the detailed description that follows may be better understood. Additional features and advantages of the disclosure will be described hereinafter, which form the subject of the claims.

BRIEF DESCRIPTION OF THE DRAWINGS

In order that the manner in which the above-recited and other enhancements and objects of the disclosure are obtained, a more particular description of the disclosure briefly described above will be rendered by reference to specific embodiments thereof which are illustrated in the appended drawings. Understanding that these drawings depict only typical embodiments of the disclosure and are therefore not to be considered limiting of its scope, the disclosure will be described with additional specificity and detail through the use of the accompanying drawings in which.

DETAILED DESCRIPTION

The particulars shown herein are by way of example and for purposes of illustrative discussion of the preferred embodiments of the present disclosure only and are presented in the cause of providing what is believed to be the most useful and readily understood description of the principles and conceptual aspects of various embodiments of the disclosure. In this regard, no attempt is made to show structural details of the disclosure in more detail than is necessary for the fundamental understanding of the disclosure, the description taken with the drawings making apparent to those skilled in the art how the several forms of the disclosure may be embodied in practice.

The following definitions and explanations are meant and intended to be controlling in any future construction unless clearly and unambiguously modified in the following examples or when application of the meaning renders any construction meaningless or essentially meaningless. In cases where the construction of the term would render it meaningless or essentially meaningless, the definition should be taken from Webster's Dictionary $3^{rd}$ Edition.

Figure 1:
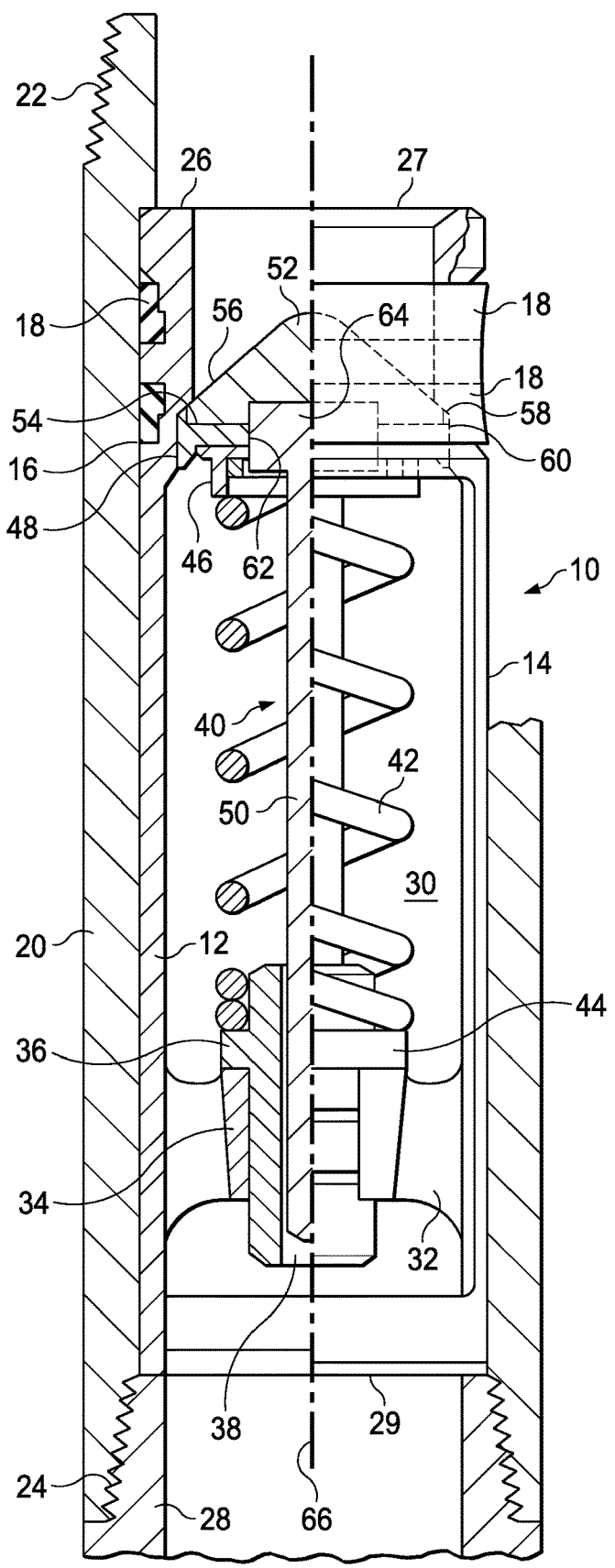
FIG. 1 is a cross-sectional view of a prior art Model F plunger-type valve.

U.S. Pat. No. 5,850,881 describes a Model F plunger-type float valve, which is herein incorporated by reference in its entirety. FIG. 1 depicts a Model F plunger-type float valve 10 within a well to control fluid flow. The float valve 10 includes a sleeve-shaped valve cage 12, which may be made from a steel metal casting and applied to carburization heat treatment in order that the surface of the valve cage 12 is resistant to wear. The valve cage comprises a generally cylindrical exterior surface 14 forming a flow path 30 therein for passing fluids through the float valve. A pair of annular side seal grooves 16 are formed on the valve cage 12, and each of the seal grooves 16 accommodates an exterior elastomeric seal 18. The seals 18 are used to prevent fluid from passing through between the valve cage 12 and a float sub 20 when the float valve 10 is positioned in the sub 20.

The float sub 20 has upper and lower threads 22 and 24 to engage with corresponding threads of other assembly on a drill pipe. A stop shoulder 26 is formed in the sub 20 for engaging the upper end surface 27 of the float valve 10, such that axial movement of the float valve 10 within the float sub 20 is restricted. The pin end 28 of a pipe may engage the bottom end surface 29 of the valve to receive the valve body within the float sub 20.

The float valve 10 further includes circumferentially spaced arms 32 which interconnect the cage 12 with a central annular body support 34. Fluid can pass through the space of the float valve between the arms to the pin end 28 of a pipe. A stem guide 36 within the central support 34 has a passageway 38 to receive a valve element 40, and the valve element 40 can move up or down in the passageway 38 during opening and closing of the valve. The support 34 and the guide 36 thus limit the valve element 40 to movement substantially along the central axis 66 of the float valve 10. The valve element 40 includes a valve stem 50 and a valve poppet 52 connected fixedly with the valve stem 50. A coiled spring 42 is set between the support 34 and the valve poppet 52 to bias the valve closed. The coiled spring 42 retains on the shoulder 44 of the guide 36. The valve element 40 further includes a valve seal disk 46 and an elastomeric valve seal 48. The valve seal disk 46 is pressed by the spring 42 into engagement with an elastomeric valve seal 48, which is pressed into engagement with the substantially planar surface 54 of the poppet 52. the poppet 52 has a conical exterior surface 56 which is configured to engage with a surface 58 on the valve body. The valve seal 48 seals with the annular sealing surface 60 on the valve body and the planar surface 54 on the poppet 52, while the interior surface 62 on the seal 48 seals with the stem 50.

In a conventional float valve, the valve cage 12 is applied to carburization heat treatment. The machined valve cage 12 is heated in the presence of a carbon-bearing material, such as charcoal or carbon monoxide to absorb carbon, such that the surface of the valve cage 12 is resistant to wear, while the core maintains strength and toughness. But the carburization heat treatment of valve cage 12 makes it prone to breakage under high pressure conditions, which will not compliance with NACE MR0175. NACE MR0175 is a material standard in the United States (globally recognized as ISO 15156). The material standard addresses requirements regarding materials for $H_2S$ service in oil and natural gas production.

The material of valve cage 12 is modified to have a nitride heat treatment. Nitriding is a ferritic thermochemical method of diffusing nascent nitrogen into the surface of steels and cast irons. This diffusion process is based on the solubility of nitrogen in iron. In an embodiment, the valve cage 12 is exposed to nitrogenous gas at 525-550° C., and the nascent nitrogen react with various alloying elements in the valve cage 12 (including but not limited to Al, Mo, Cr, or combinations thereof) to form nitrides. The nitride layer formed on the surface of the valve cage 12 is very hard.

The benefit of the nitriding process is that it does not require a phase change from ferrite to austenite, nor does it require a further change from austenite to martensite. The steel of the valve cage 12 remains in the ferrite phase during the complete procedure. This means that the molecular structure of the ferrite (body-centered cubic (bcc) lattice) does not change its configuration or grow into the face-centered cubic (fcc) lattice characteristic of austenite, as occurs in more conventional methods such as carburizing. Furthermore, because only free cooling takes place, rather than rapid cooling or quenching, no subsequent transformation from austenite to martensite occurs. Further, as there is no molecular size change and, more importantly, no dimensional change, only slight growth due to the volumetric change of the steel surface is caused by the nitrogen diffusion. The induced surface stresses being released by the heat of the process can produce distortion, causing movement in the form of twisting and bending. Gas nitriding causes the valve cage 12 to acquire high hardness, enhanced corrosion properties, and considerably improved wear resistance and fatigue strength on the surface of valve cage 12 by diffusion of atomic nitrogen through the surface.

The internal components in a conventional float valve are made of 1018 cold or hot rolled steel. For NACE MR0175, the internal components in the present disclosure are made from 1018 hot rolled steel (NACE MR0175 A.2.1.2). In an embodiment, internal components comprise a body support, a stem guide, a valve element, a valve stem, and a valve poppet. In an embodiment, the internal components comprise a coiled spring.

Figure 2:
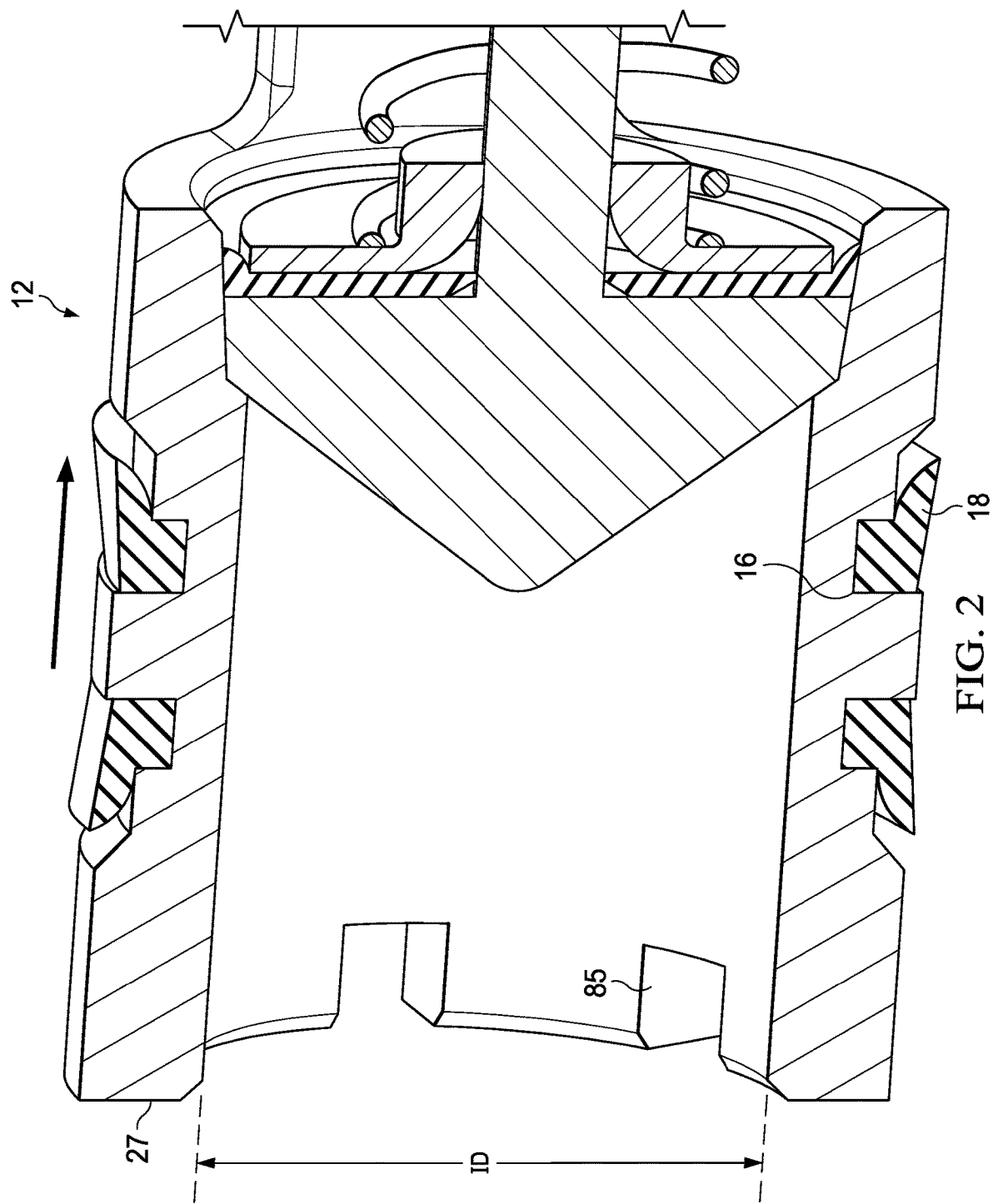
FIG. 2 is a cross-sectional view of top end of the float valve in accordance with the described embodiments.

FIG. 2 is a cross-sectional view of the top end of the float valve in accordance with various embodiments. Referring to FIG. 2, the side seal grooves 16 and seals 18 are repositioned to be further towards the downstream side of the valve (compared with the conventional float valve), away from the upper end surface 27 (in the direction of the arrow), such that the side seal grooves 16 can bear higher pressure. This improves the stress level. Stress levels around the poppet sealing surface are improved by keeping the outside diameter of a conventional float valve unchanged and reducing the inner diameter (ID) or throat of the valve, since the contact area between the poppet sealing surface and the inner surface of the valve cage 12 is enlarged. The mode of a conventional float valve is 5RF and three castle cutouts are provided on the top end of the valve cage 12 of the 5RF float valve. Three additional castle cutouts 85 are added to the valve cage 12 to assist with product identification and visually differentiate from the current production 5RF valve cage. The six castle cutouts 85 are distributed evenly along the circumference of the valve cage 12.

A valve cage of conventional 5RF float valve has an outer diameter of 3.875 inches (") (inches) and inner diameter of 2.75". In an embodiment, to improve stress levels around the poppet sealing surface, the inner diameter of the valve cage 12 of the float valve can be reduced to 2.70" In an embodiment, the inner diameter of the valve cage 12 can be 2.72".

Figure 3:
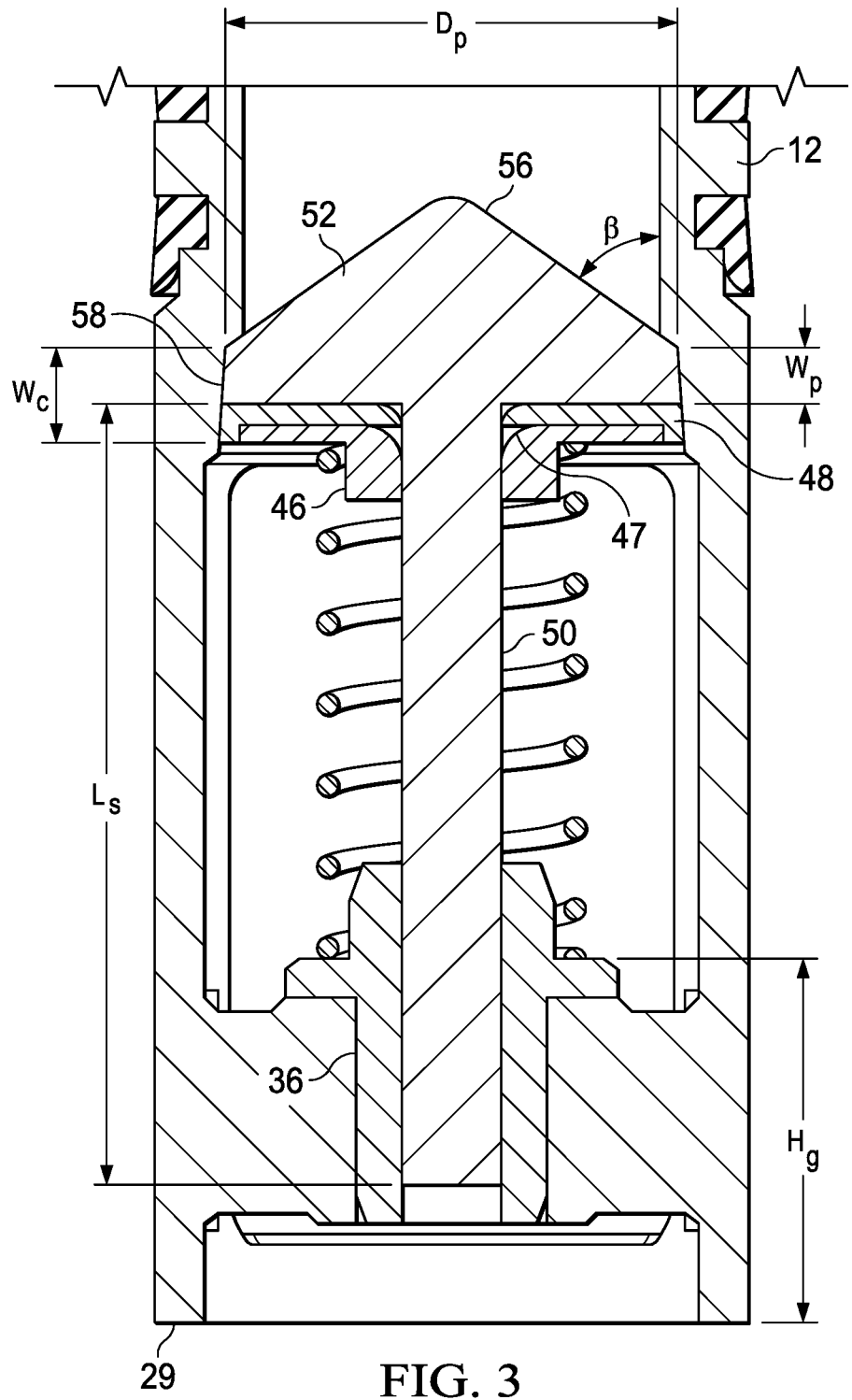
FIG. 3 is a cross-sectional view a Model F plunger-type float valve in accordance with the described embodiments.

FIG. 3 is a cross-sectional view of a float valve. In FIG. 3, the angle between the inner surface of valve cage 12 and conical exterior surface 56 of the poppet 52 is referred to as interface angle β, the thickness of the poppet 52 is refer to as $W_p$, the outer diameter of the bottom of poppet 52 is refer to as $D_p$, the sum of the thickness of the poppet 52 and the seal 48 is refer to as $W_c$, the length of the valve stem 50 is refer to as $L_s$ and the length between the shoulder of stem guide 36 and end surface 29 of the valve body is refer to as $H_g$.

In an embodiment, to improve the stress response of the cage/valve interface under elevated differential pressure loading, valve seat interface 58 towards the downstream side of the valve side can be repositioned and the interface angle β can be increased compared with a conventional float valve.

In another embodiment, the guide 36 is repositioned toward the downstream side of the float valve to maintain ease of assembly and field service of the valve for high pressure design. The $L_s$ of the stem can be reduced to prevent the valve stem from sticking out of the back of the valve. The thickness $W_p$ of the poppet 52 is increased to improve the pressure carrying capabilities, and the diameter $D_p$ of the poppet 52 is reduced to allow for usage of current production elastomer seal 48 with the new design. Correspondingly, the valve seat interface 58 can be increased slightly to ensure adequate seal contact with the valve cage 12 based on the updates to the poppet 52 design. In an embodiment, the mode of a conventional float valve is 5RF, the interface angle β is 45 degrees. To improve the stress response of the poppet 52, exterior surface 56 of the poppet 52 can be modified such that the interface angle β is larger than about 45 degrees. In an embodiment, the interface angle β in a new design can vary from about 50 degrees to about 60 degrees. In an embodiment, the interface angle β is about 55 degrees.

The mode of a conventional float valve is 5RF, the $H_g$ is 3.500", the $L_s$ is 5.484", the $D_p$ is 2.990", the $W_p$ is 0.125", and the $W_c$ is 0.562". In an embodiment, the $W_p$ can be increased to about 0.375" to improve the pressure carrying capability. In an embodiment, the $W_c$ can be increased to about 0.688" and the $D_p$ can be decreased to about 2.948". Correspondingly, the $H_g$ can be reduced to about 2.375" such that the position of the guide 36 can be adjusted. The $L_s$ can be reduced to about 5.148" to prevent valve stem 50 from sticking out of the back of the valve.

Figure 4:
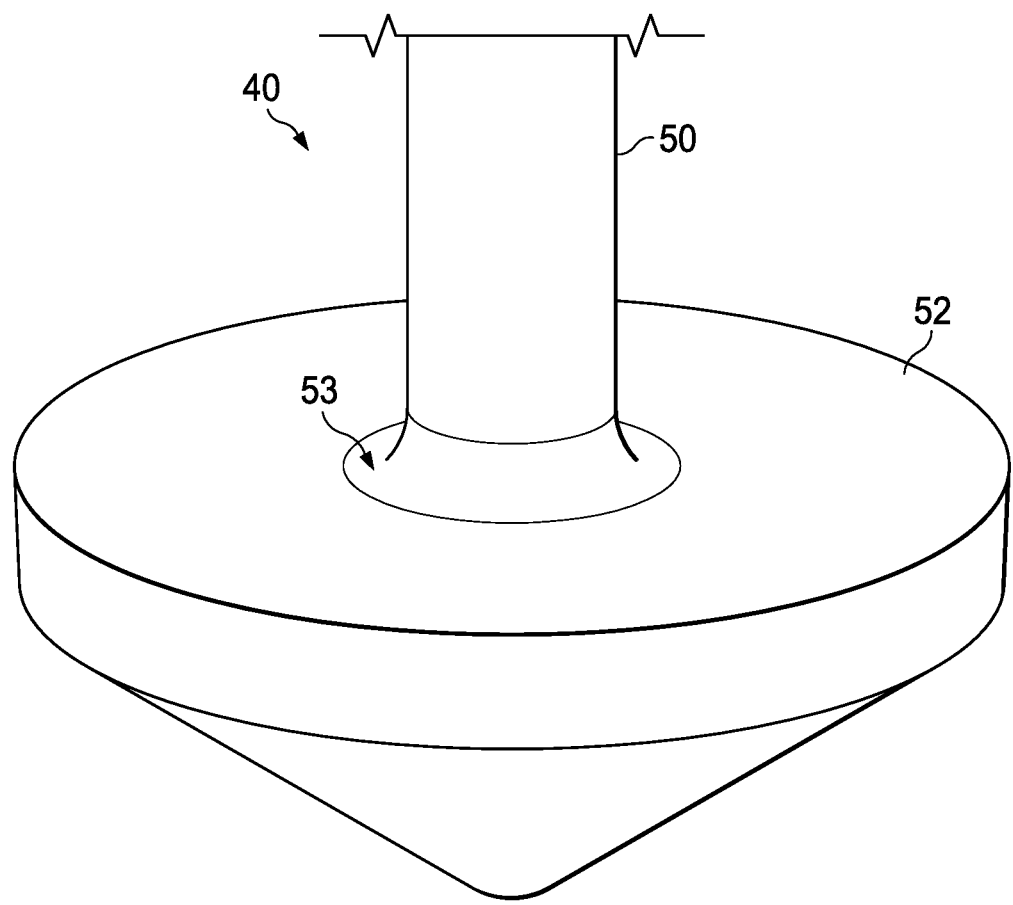
FIG. 4 is a perspective view of a valve element in accordance with the described embodiments.

In a practical application, the valve element 40 is prone to breakage at the junction of the valve stem 50 and the valve poppet 52 when the valve is subjected to high pressure. This can occur because there is an increase in the localized stress near the sharp corner between the valve poppet 52 and the valve stem 50. The body of valve element 40 tends to fail from this sharp corner where the stress concentration is more than other places. To address the prior field issues with broken valve stems, a large machined fillet 53 is added to the corner between the valve stem 50 and the valve poppet 52 (FIG. 4). By providing the fillet radius at the sharp corners, the cross-section area decreases gradually instead of suddenly, and this distributes the stress in the valve element 40 more uniformly Referring back to FIG. 3, the valve seal disk 46 besiege the junction of the valve stem 50 and the valve poppet 52. In an embodiment, due to the fillet, the radius contour 47 of the valve seal disk 46 should increase to match new contour of the valve stem.

Figure 5:
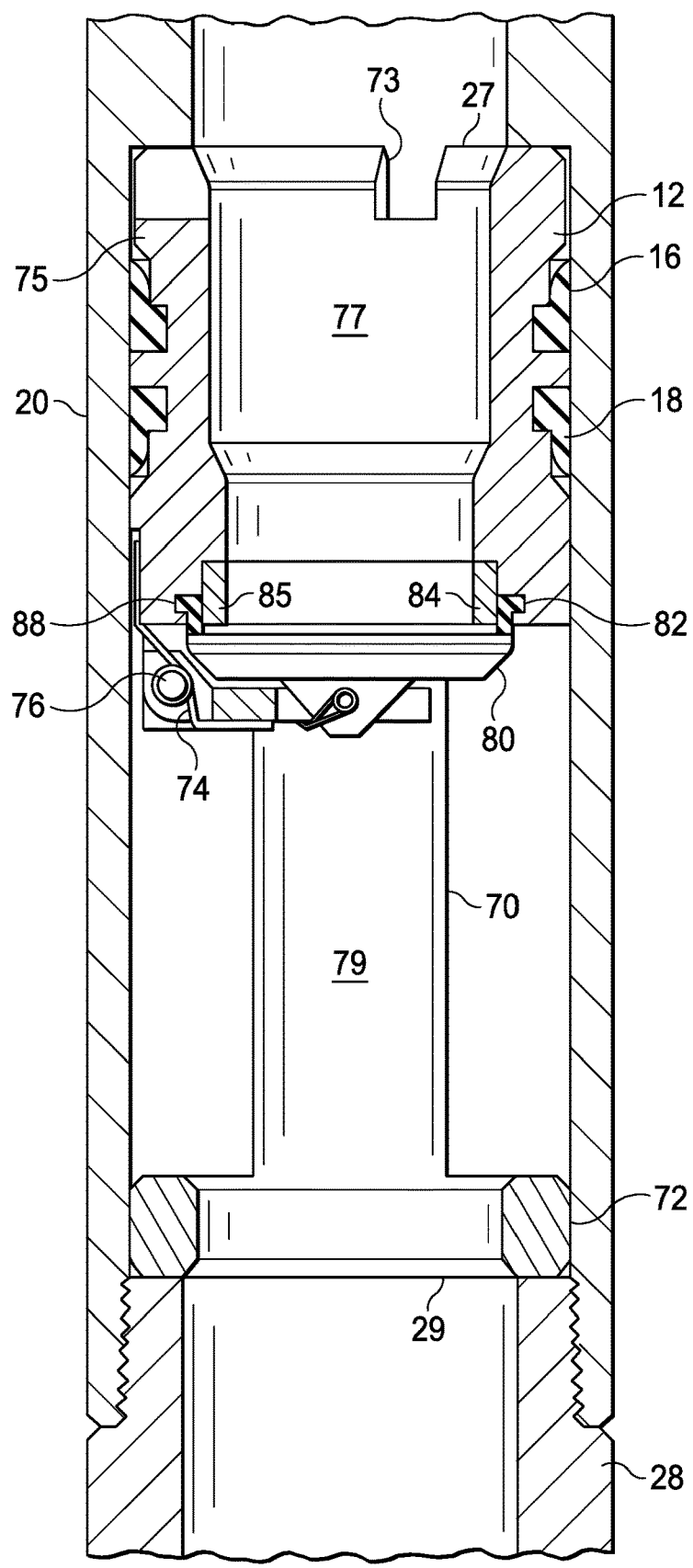
FIG. 5 is a cross-sectional view of a prior art Model G flapper-type valve.

U.S. Pat. No. 3,058,534 describes a Model G flapper-type float valve, which is herein incorporated by reference in its entirety. FIG. 5 depicts a Model G flapper-type float valve for positioning downhole within a well to control fluid flow. Referring to FIG. 5, a float valve is placed within a string of drill pipe, the upper end of the pipe providing a stop shoulder for engaging the upper end surface 27 of a valve cage 12. The pin end 28 of an adjacent drill may engage the bottom end surface 29 of the valve to receive the valve body within a float sub.

The valve cage 12 includes an upper portion 75 having a central passage 77 therethrough. It also includes a lower portion 72 resting on the lower stop shoulder of an adjacent drill, and a passage 79 for passing fluids through the float valve. These two portions 75 and 79 are connected by a plurality of legs 70.

A pair of annular side seal grooves 16 are formed on the valve cage 12, and each of the seal grooves 16 accommodates an exterior elastomeric seal 18. The seals 18 are used to prevent fluid from passing through between the valve cage 12 and a float sub 20.

The lower end of the upper body portion 75 is a valve seat 88 having a seal ring 82, and the seal ring 82 projects below the lower metallic face of the valve seat 88. The seal ring 82 is protected by a retainer sleeve 84 which locates within a seal retainer cavity 85 in the valve cage 12. This sleeve 84 makes a press fit within the valve cage 12 and also fits across the inner surface of the seal ring 82.

The valve can be closed to block the flow of fluid in the passage 77 when a flapper valve 80 swings upwardly to engage with the lower end of the seal ring 82, as disclosed in FIG. 5, the flapper valve 80 has a disc shape having its upper face adapted to engage the lower end of the seal ring 82. An arm (not shown) extends to the side of the cage 12 with the outer parts of the arm being integral with the upper valve cage body portion 75. A hinge pin 76 extends through aligned holes or bores to provide a pivotal support for the flapper valve 80 to one side of the valve cage 12, whereby the flapper valve 80 can swing downwardly to one side of the valve cage 12 to provide an opening through the passage 77. The flapper valve 80 is urged in an upward direction by a spring 74 which encircles the hinge pin 76.

The float valve can be utilized in drill pipes for controlling the flow of fluid therethrough, when a pressure below the float valve is higher than that above the float valve, the flapper valve 80 will swing upwardly to prevent upward flow of fluid through the string of drill pipe. However, when the drilling mud or other fluid is pumped down through the drill pipe, it will force the flapper valve 80 to open, such that the drilling fluid can flow through the drill pipe. During the downward pumping of the fluid, it will not move along the rubber sealing element 82.

In an embodiment, for the present device to comply with NACE MR0175, similar to the heat treatment to valve cage 12 in a Model F plunger-type float valve, the material of valve cage 12 of the Model G flapper-type float valve is modified to have a nitride heat treatment. The process and benefit of the nitride heat treatment are as described above. The internal components of the Model G flapper-type float valve in the present disclosure are modified to be made from 1018 hot rolled steel.

In an embodiment, the mode of a conventional Model G flapper-type float valve is 5RG and three castle cutouts 73 are provided on the top end of the valve cage 12 of the 5RG float valve. To help with product identification and differentiation from the current production 5RG valve cage, three additional castle cutouts 73 are added to the valve cage 12. In an embodiment, the six castle cutouts 73 are distributed evenly along the circumference of the valve cage 12.

Figure 6:
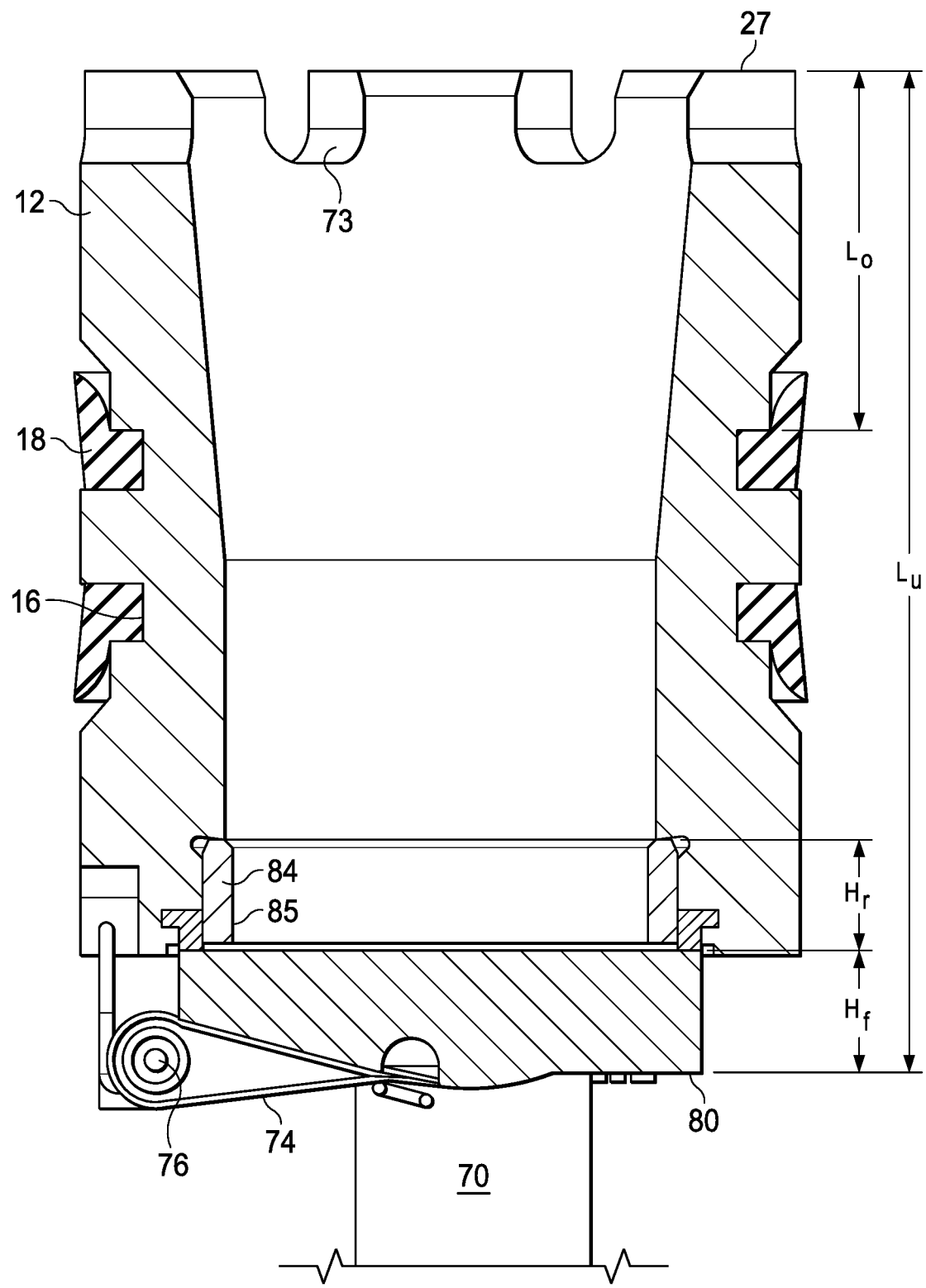
FIG. 6 is a cross-sectional view of a Model G flapper-type float valve in accordance with the described embodiments.

FIG. 6 is a cross-sectional view of a Model G flapper-type float valve in accordance with the described embodiments. In FIG. 6, the length from the upper end surface 27 to the interface between the flapper valve 80 and the cage 12 is refer to as $L_u$, the thickness of the flapper valve 80 is refer to as $H_f$, the height of the seal retainer cavity 85 is refer to as $H_r$, and the length from the upper end surface 27 to the shoulder of the upper side seal groove 16 is referred to as $L_o$.

In an embodiment, the Model G flapper-type float valve can be modified to meet the requirement of high pressure in the downhole. In an embodiment, the height of the flapper is increased to reduce the stress at elevated pressures; and the outer seals are repositioned to the downstream side of the valve to reduce the stress of the cage at elevated pressures. Correspondingly, the flapper interface can be repositioned towards the downstream side of the valve to allow for clearance of the repositioned side seal grooves 16. The height of the seal retainer cavity 85 is increased to prevent interchangeability with the previous production designs, and the depth of the seal retainer cavity 85 is increased.

In an embodiment, the mode of a current float valve is 5RG, Lo is 1.240", Hr is 0.500", Hf is 0.418" and Lu is 3.750". In an embodiment, to improve the pressure carrying capability, Lo can be increased to about 1.972". Correspondingly, in an embodiment, Lu can be increased to about 4.750". In an embodiment, Hr can be increased to about 0.568" and Hf can be increased to about 0.668".

Figure 7:
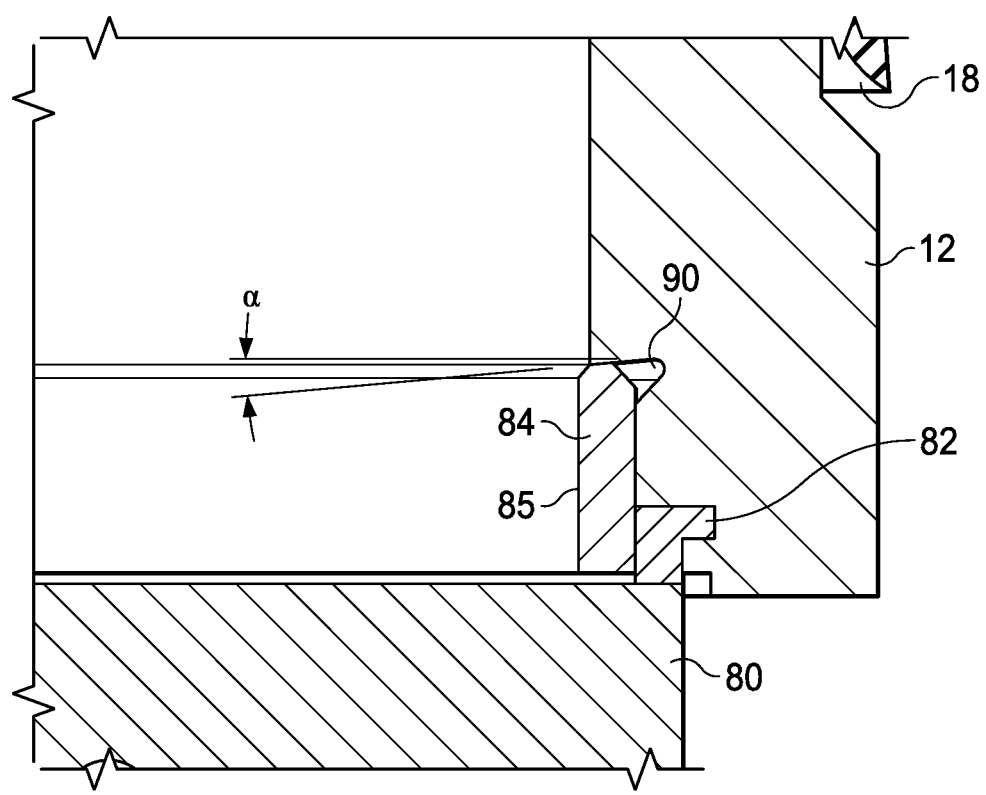
FIG. 7 is an enlarged cross-sectional view showing in detail a seal retainer cavity in accordance with the described embodiments.

In practical application, it is found that the seal retainer cavity 85 in a conventional float valve is prone to crack at its sharp base corner when the valve is subjected to high pressure, since stress is concentrated at the sharp base corner. The seal retainer cavity 85 tends to fail from this sharp corner where the stress concentration is more than other places. To reduce the stress concentration in the cage at the corner of the seal retainer cavity 85 at elevated pressures, a dovetail groove 90 is provided at the base of the seal retainer cavity 85 in the cage 12 (FIG. 7). A back angle α is provided to the sealing surface to help reduce the chance for extrusion of the seal retainer 84 into the inner diameter of the valve cage 12. In an embodiment, the back angle α can be from about 3.0 degrees to about 8.0 degrees. In a preferred embodiment, the back angle α is about 5.0 degrees.

Figure 8:
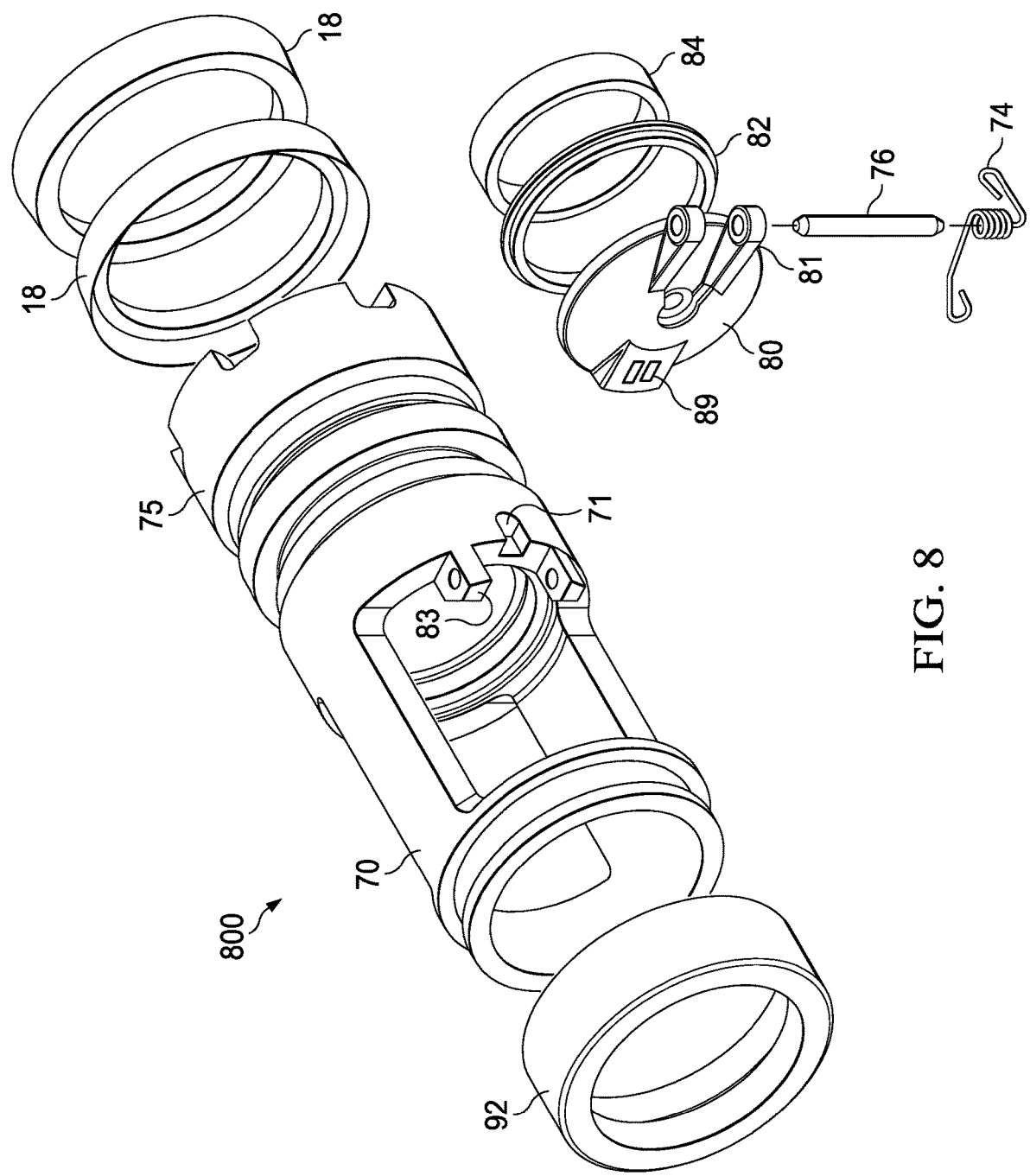
FIG. 8 is an exploded view of a flapper-type 5R Model G float valve in accordance with the described embodiments.

FIG. 8 is an exploded view of a flapper-type 5R Model G float valve 800 in accordance with the described embodiments. The float valve 800 in FIG. 8 is similar to the valve in FIG. 5, the difference lies in that a shock absorber 92 connects to the bottom of the valve to reduce the impact on the valve, and that a recessed part 71 is between the two ears 83 which support the flapper valve 80.

Figure 9:
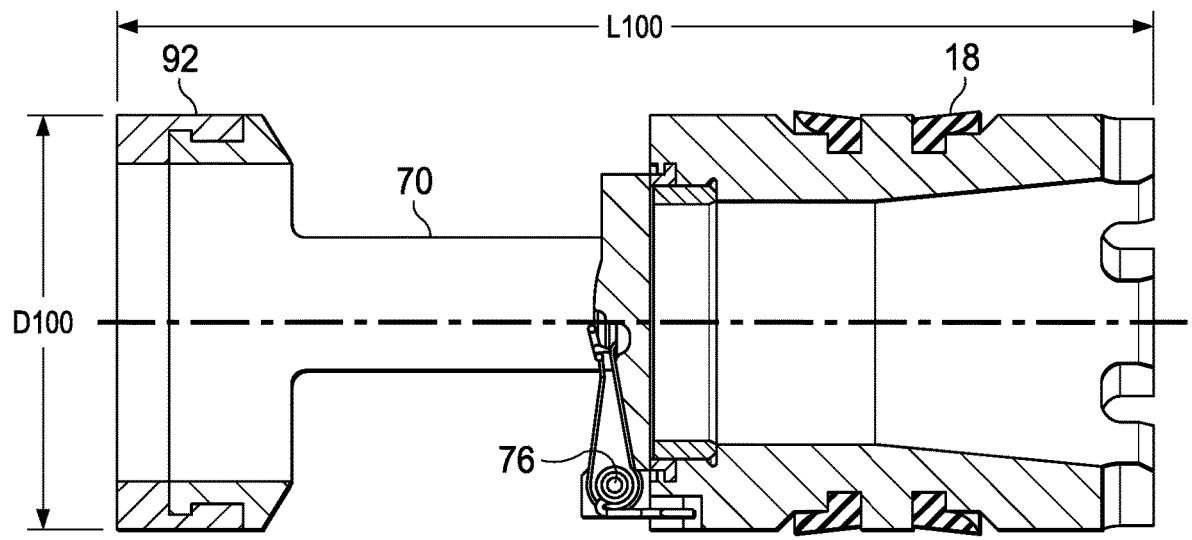
FIG. 9 is a cross-sectional view of the float valve in FIG. 8.
Figure 10:
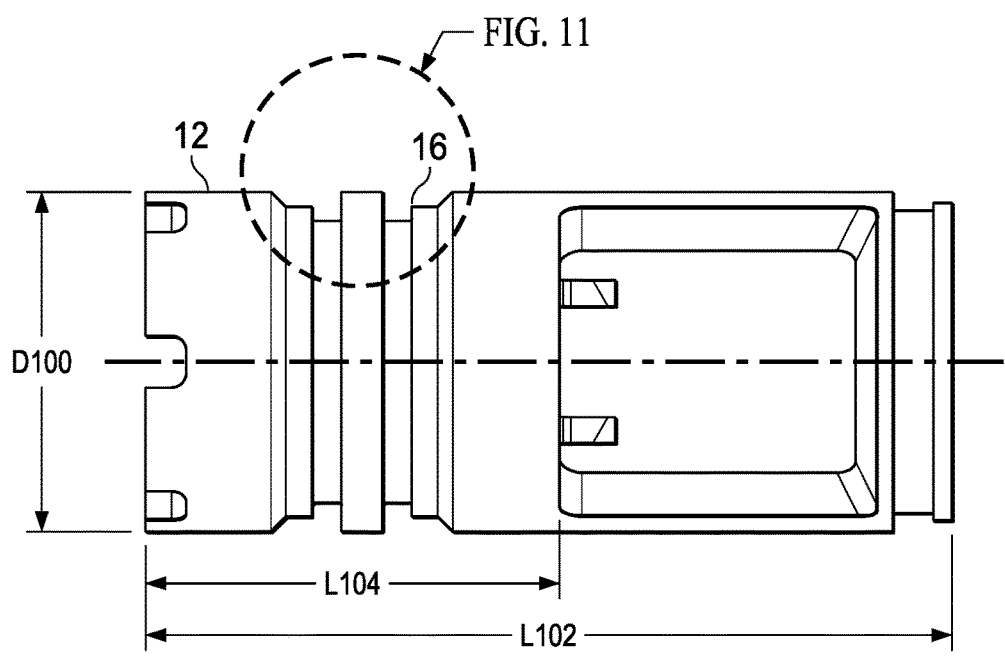
FIG. 10 is a front view of the float valve in FIG. 8.
Figure 11:
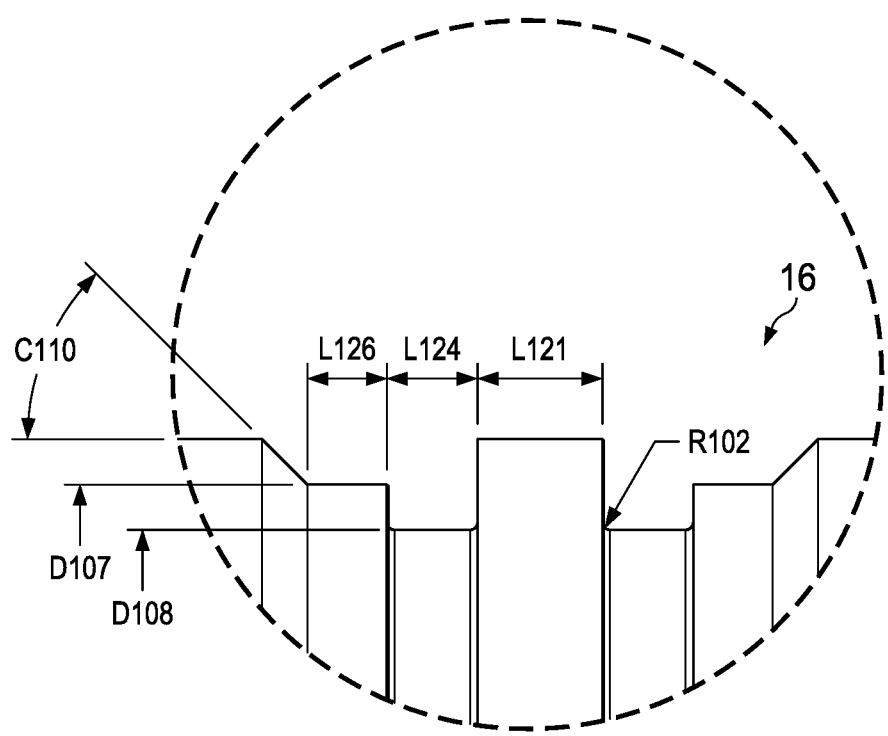
FIG. 11 is a detailed view of area A in FIG. 10.

FIG. 9 is a cross-sectional view of the float valve 800 in FIG. 8, to improve the pressure carrying capability, the length L100 of the float valve 800 and assembled shock absorber 92 is 9.750" and the outer diameter D100 of the float valve 800 is 3.875". FIG. 10 is a front view of the float valve 800 in FIG. 8, the length L102 of the float valve is 9.250" and the length L104 of the upper body portion 75 is 4.750". FIG. 11 is a detailed view of area A in FIG. 10, it describes the sizes of the seal grooves 16. The distance L121 between the two grooves 16 is 0.500", each of the groove 16 include two portions, deep groove portion and shallow groove portion, the outer diameter D108 of the deep groove portion is 3.220" and the width L124 of the deep groove portion is 0.328" while the outer diameter D107 of the shallow groove portion is 3.562" and the width L126 of the shallow groove portion is 0.313". Two fillets are provided to reduce the stress concentration in the deep groove at the corner, the fillet radius R102 is 0.030". There is a slope plane between the shallow groove portion and the outer surface of the valve 800 to reduce the stress concentration and the inclined angle C110 of the slope plane is 45 degrees.

Figure 12:
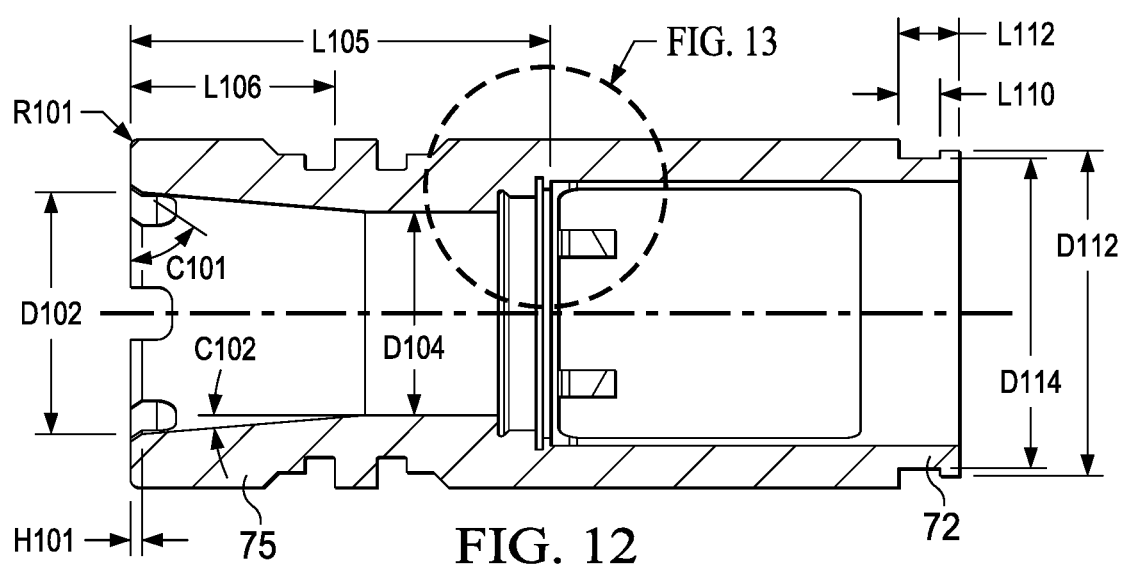
FIG. 12 is another cross-sectional view of the float valve in FIG. 8.

FIG. 12 is another cross-sectional view of the float valve 800, the distance L106 from the top surface of the valve 800 to the bottom of the upper seal groove 16 is 2.250" and the distance L105 from the top surface of the valve 800 to the bottom of the seal ring 82 is 4.688", the lower portion 72 include a grove to engage the shock absorber 92. The outer diameter D114 of the groove is 3.42" and the distance L112 between the top surface of the groove to the bottom surface of the float valve 800 is 0.687". At the bottom of the float valve 800, the outer diameter D112 of the shoulder is 3.61", and the distance L110 between the bottom surface of the groove to the bottom surface of the float valve 800 is 0.500". The inner side of upper body portion 75 is a slope plane, such that the inner diameter D102 of the upper body portion 75 at the top surface of the float valve 800 is 2.750" while the smallest inner diameter D104 of the upper body portion near the bottom of the upper body portion 75 is 2.313", the inclined angle C102 of the slope in the inner side of upper body portion 75 is 5 degrees. To reduce the stress concentration at the top end of the upper body portion 75, the top of the inner side of upper body portion 75 provides a chamfer with the inclined angle C101 of which is 60 degrees, and the height H101 of which is 0.125", the top of the inner side of upper body portion 75 provides a fillet with the radius R101 of which is 0.031".

Figure 13:
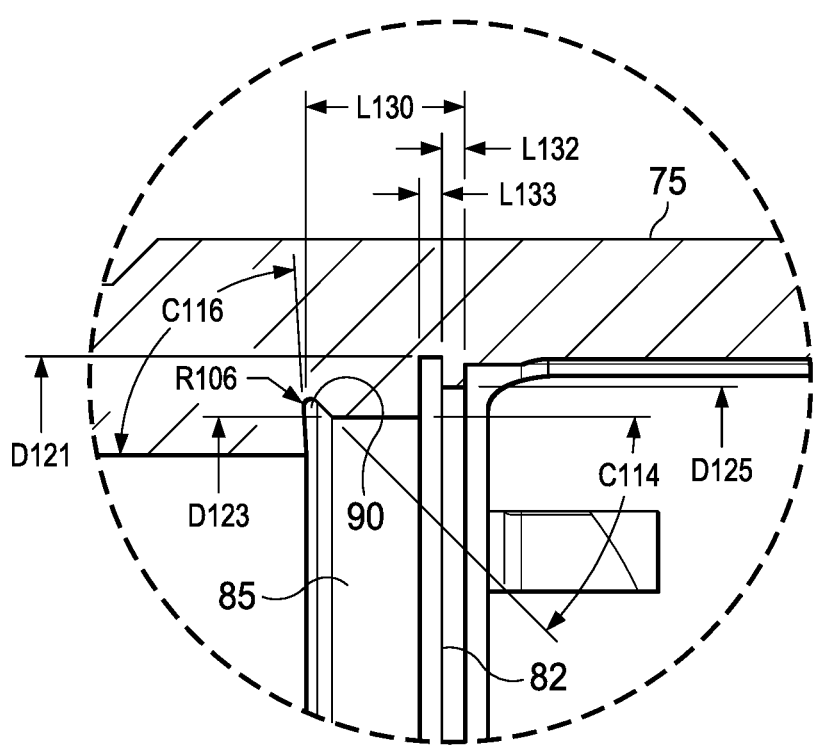
FIG. 13 is a detailed view of area C in FIG. 12.

FIG. 13 is a detailed view of area C in FIG. 12, it describes the sizes of the seal retainer cavity 85 and the seal ring 82. The distance L130 from the top of the seal retainer cavity 85 to the bottom of the seal ring 82 is 0.563". The seal ring 82 includes two parts, the big ring and the small ring, the outer diameter D121 of the big ring is 3.000" and the outer diameter D125 of the small ring is 2.795". The width of the big ring L132 is 0.093" and the width of the small ring L133 is 0.087". The diameter D123 of the seal retainer cavity 85 is 2.558". To reduce the stress concentration in the cage at the corner of the seal retainer cavity 85 at elevated pressures, a dovetail groove 90 is provided at the base of the seal retainer cavity 85. The dovetail groove 90 has a rounded corner with the radius R106 of which is 0.03". Referring to FIG. 13, the angle of C116 is 85 degrees, thus the back angle α is 5.0 degrees. The angle C114 between extended line of dovetail groove 90 and the inner side of the upper body portion 75 is 45 degrees.

Figure 14:
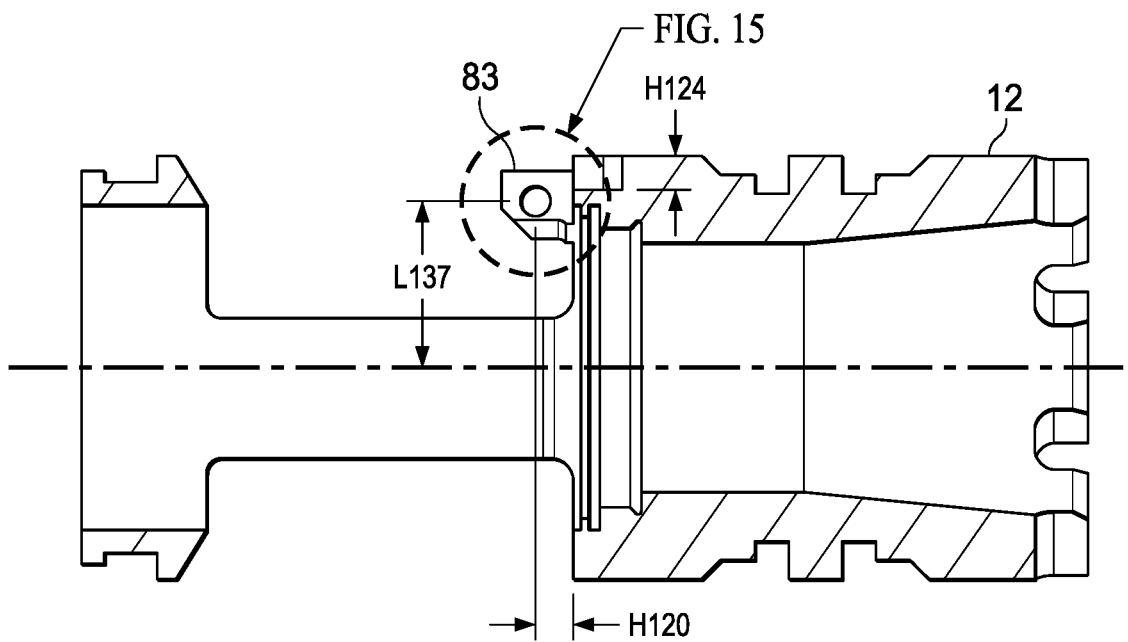
FIG. 14 is another cross-sectional view of the float valve in FIG. 8 showing an ear.
Figure 15:
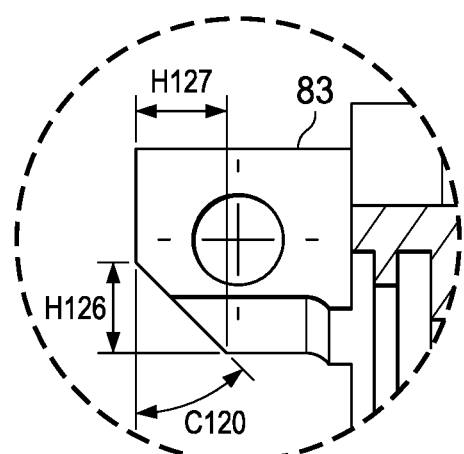
FIG. 15 is a detailed view of area F in FIG. 14.

FIG. 14 is another cross-sectional view of a float valve 800 showing an ear 83 on upper body portion 75. The distance L137 from the center of the ear 83 to the axis of the float valve is 1.532", and the distance H120 from the center of the ear 83 to the bottom of the valve cage 12 is 0.315", the height H124 of the recessed part 71 is 0.312". FIG. 15 is a detailed view of area F in FIG. 14, it describes the sizes of the ear 83. There is a chamfer on the ear 83 with the inclined angle C120 of which is 45 degrees such that both of the chamfer's two right angle sides H126 and H127 are equal to 0.251".

Figure 16:
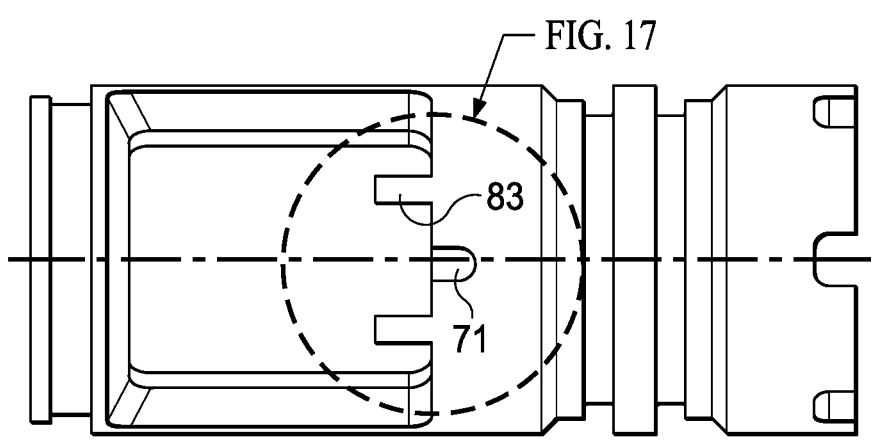
FIG. 16 is a front view of the float valve in FIG. 8 showing the ears and the recessed part.
Figure 17:
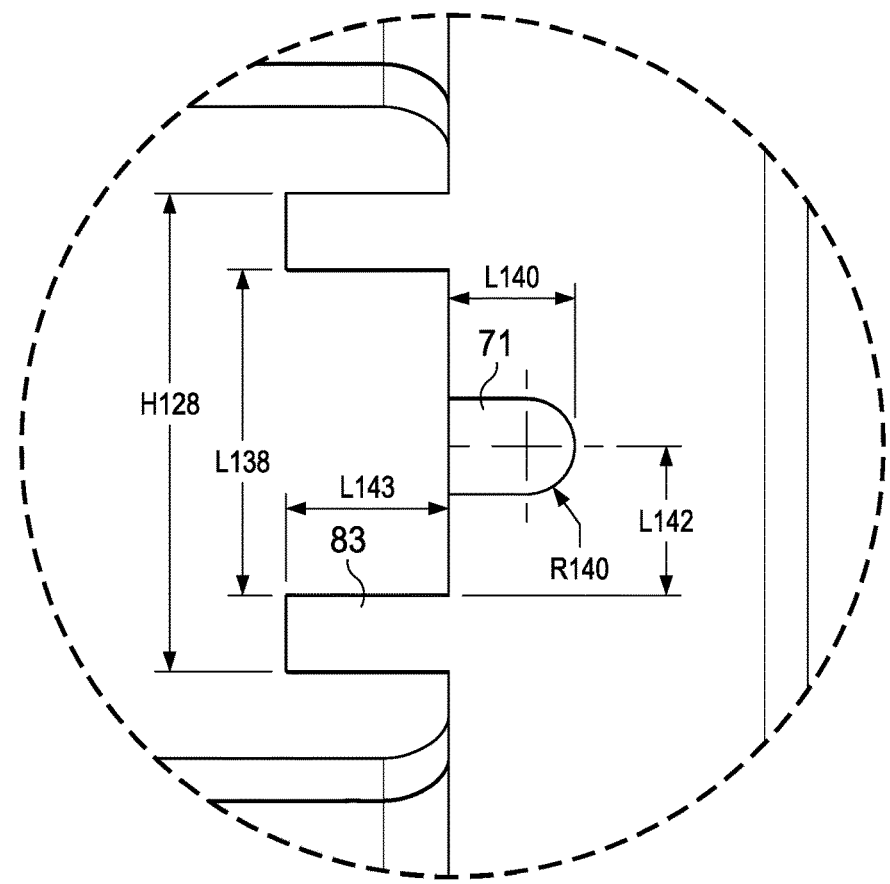
FIG. 17 is a detailed view of area D in FIG. 16.

FIG. 16 is a front view of a float valve 800 showing the ears 83 and the recessed part 71. FIG. 17 is a detailed view of area D in FIG. 16, it describes the sizes of the ear 83 and the recessed part 71. The distance L138 between the two ears 83 is 1.255", the width H128 of each of the ear is 0.287" and the height L143 of the ear is 0.625", the distance L142 between the center of the recessed part 71 and the inner surface of an ear 83 is 0.565", the height L140 of the recessed part 71 is 0.500", and the radius R140 of the recessed part 71 is 0.188".

In an embodiment, the body of the float valve 800 is made from 1519-5RG-001-C steel. During the process of heat treatment, the float valve 800 is applied to gas nitride treatment to make its hardness to be 45-55 RC and max case depth to be 0.006".

Figure 18:
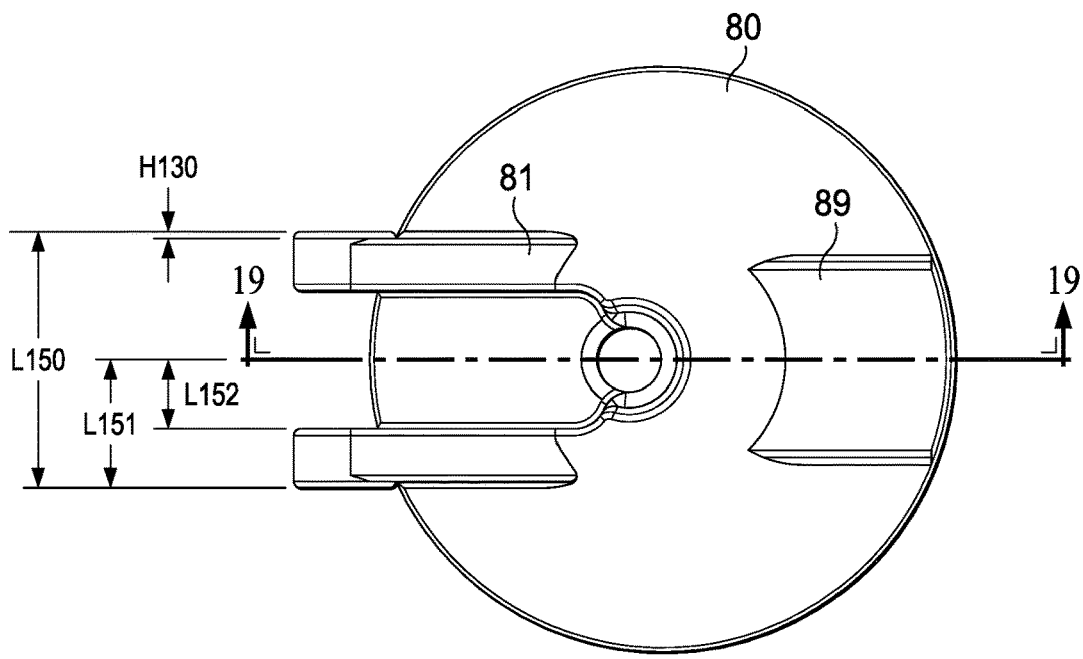
FIG. 18 is a top view of a flapper valve.

FIG. 18 is a top view of a flapper valve 80. On the top of the flapper valve 80, the outer surface distance L150 between two arms 81 is 1.245", the distance L151 between the centerline of the flapper valve 80 and the outer surface of an arm is 0.623", the distance L152 between the centerline of the flapper valve 80 and the inner surface of an arm is 0.335", each of the arm protrudes outward a distance H130 of 0.031" at the root segment.

Figure 19:
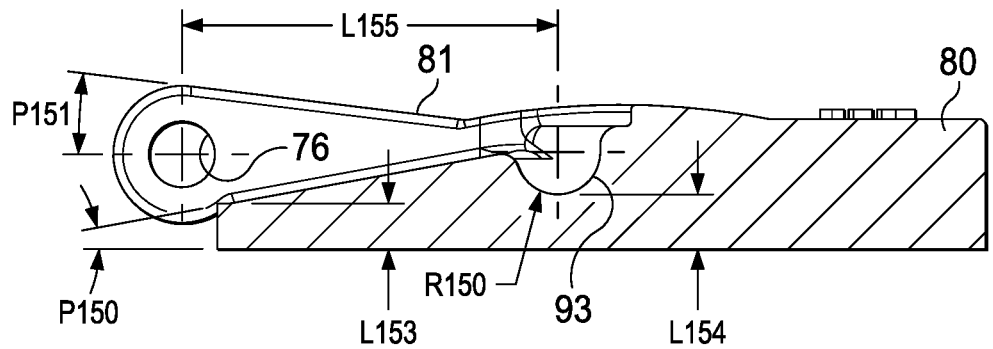
FIG. 19 is a cross-sectional view of a flapper valve alone line A-A in FIG. 18.

FIG. 19 is a cross-sectional view of a flapper valve 80 alone line A-A in FIG. 18. A hemispherical hole 93 with the radius R150 being 0.156" is provided on the top of the flapper valve 80 to accommodate one end of the spring 74. The distance L155 between the center of the hinge pin 76 and the center of the hemispherical hole 93 is 1.375", the distance L154 between the bottom of the hemispherical hole 93 and the bottom of the flapper valve 80 is 0.202", and the distance L153 between the bottom of the arm 81 and the bottom of the flapper valve 80 is 0.164". The inclined angle P150 of the slope bottom plane of the arm 81 is 10.0 degrees, and the inclined angle P151 of the slope top plane of the arm 81 is 7.0 degrees.

Figure 20:
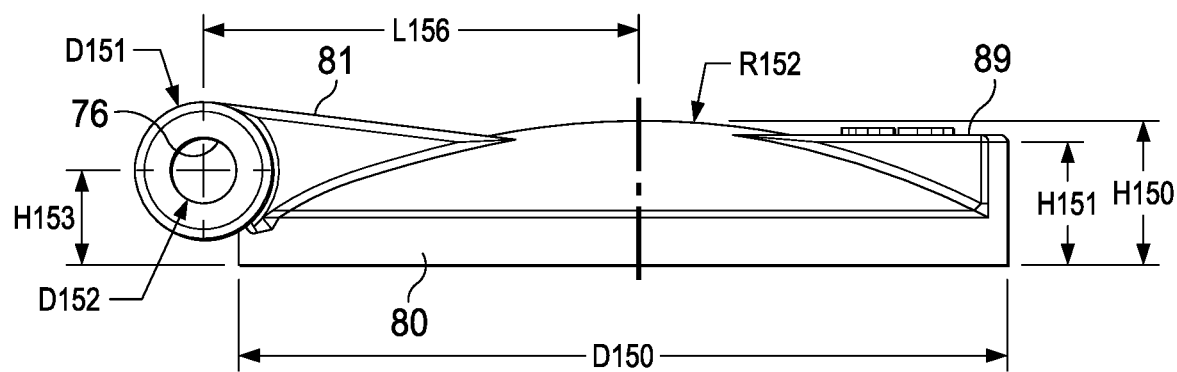
FIG. 20 is a front view of the flapper valve in FIG. 18.

FIG. 20 is a front view of the flapper valve 80 in FIG. 18. The diameter D150 of the flapper valve 80 is 2.812", The height H150 of the flapper valve 80 is 0.539" and the distance H151 between the top of the boss 89 and the bottom of the flapper valve 80 is 0.451". The radius R152 for the upper part of the flapper valve 80 is 2.96", the outer diameter D151 of the ear 81 is 0.500" and the inner diameter D152 of the ear 81 is 0.25". The distance H153 between the center of the ear 81 and the bottom of the flapper valve 80 is 0.348".

Figure 21:
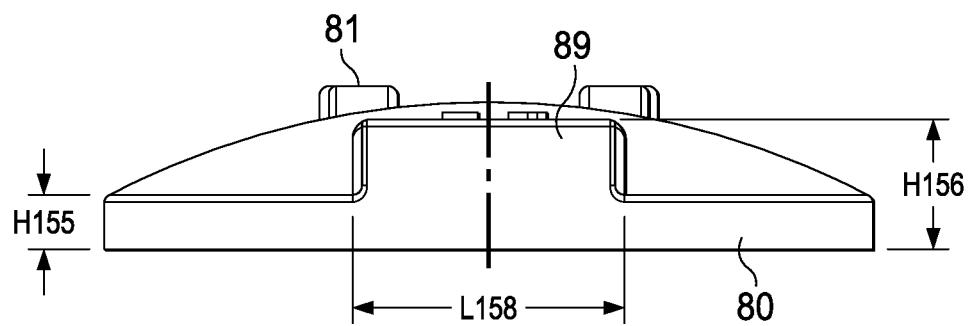
FIG. 21 is a front view of the flapper valve in FIG. 18 showing the sizes of the boss.

FIG. 21 is a front view of the flapper valve 80 in FIG. 18 showing the sizes of the boss 89. The width L158 of the boss 89 is 0.987", the height H156 from the top of the boss to the bottom of the flapper valve 80 is 0.481", and the height H155 from the bottom of the boss to the bottom of the flapper valve 80 is 0.188".

In an embodiment, the flapper valve 80 is made of AISI 1035 steel whose wear resistance and hardenability are increased by the addition of small quantity of chromium. During the process of heat treatment, the flapper valve 80 is applied to normalize to make its hardness to be 95-99 HRB and then applied to gas nitride treatment to make its hardness to be 45-55 RC and max case depth to be 0.006".

All of the compositions and methods disclosed and claimed herein can be made and executed without undue experimentation in light of the present disclosure. While the compositions and methods of this disclosure have been described in terms of preferred embodiments, it will be apparent to those of skill in the art that variations may be applied to the compositions and methods and in the steps or in the sequence of steps of the methods described herein without departing from the concept, spirit and scope of the disclosure. More specifically, it will be apparent that certain agents which are both chemically related may be substituted for the agents described herein while the same or similar results would be achieved. All such similar substitutes and modifications apparent to those skilled in the art are deemed to be within the spirit, scope and concept of the disclosure as defined by the appended claims.

What is claimed is:

1. A high-pressure float valve, comprising:
   a valve cage having a pair of side seal grooves each for receiving an exterior elastomeric seal therein, wherein the valve cage is exposed to a nitride heat treatment;
   internal components within the valve cage, wherein the internal components of the valve cage are made from hot rolled steel;
   a flapper valve capable of engagement with a lower end of a seal ring, the seal ring protected by a retainer sleeve, wherein the retainer sleeve fits within a seal retainer cavity in the valve cage;
   a dovetail groove located at a base of the seal retainer cavity in the valve cage;
   two ears which support the flapper valve; and
   a recessed part between the two ears,
   wherein the high-pressure float valve can undergo pressures up to 10 ksi, and
   wherein a plurality of cutouts is present at a top end of the valve cage.

2. The high-pressure float valve of claim 1 wherein the pair of side seal grooves are present on a downstream side of the high-pressure float valve.

3. A high-pressure float valve, comprising:
   a valve cage having a pair of side seal grooves each for receiving an exterior elastomeric seal therein, wherein the valve cage is exposed to a nitride heat treatment;
   internal components within the valve cage, wherein the internal components of the valve cage are made from hot rolled steel; and wherein the high-pressure float valve can undergo pressures up to 10 ksi;
   a flapper valve capable of engagement with a lower end of a seal ring, the seal ring protected by a retainer sleeve,
   the retainer sleeve fitting within a seal retainer cavity of the valve cage;
   a dovetail groove located at a base of the seal retainer cavity in the valve cage;
   two ears which support the flapper valve; and
   a recessed portion between the two ears.

4. The high-pressure float valve of claim 3, further comprising a back angle located at a sealing surface of the seal retainer cavity.

5. The high-pressure float valve of claim 4, wherein the back angle is 3.0 degrees to 8.0 degrees.

6. The high-pressure float valve of claim 5, wherein the back angle is 5.0 degrees.

7. The high-pressure float valve of claim 3, wherein a thickness of the flapper valve is 0.418 inches.

8. The high-pressure float valve of claim 3, wherein a height of the seal retainer cavity is 0.500 inches.

* * * * *